United States Patent
Hughes et al.

(10) Patent No.: US 12,286,178 B1
(45) Date of Patent: Apr. 29, 2025

(54) SYSTEMS AND METHODS FOR INSTALLING TRIM MOLDING

(71) Applicant: GM GLOBAL TECHNOLOGY OPERATIONS LLC, Detroit, MI (US)

(72) Inventors: Terebara Hughes, Warren, MI (US); Wuhua Yang, Superior Township, MI (US); William H. Gillespie, IV, Grand Blanc, MI (US); Miguel Arturo Saez, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 14 days.

(21) Appl. No.: 18/542,407

(22) Filed: Dec. 15, 2023

(51) Int. Cl.
*B62D 65/14* (2006.01)
*B25J 11/00* (2006.01)
*B25J 15/06* (2006.01)
*B62D 65/02* (2006.01)

(52) U.S. Cl.
CPC ............. *B62D 65/14* (2013.01); *B25J 11/005* (2013.01); *B25J 15/0616* (2013.01); *B62D 65/024* (2013.01)

(58) Field of Classification Search
CPC .... B25J 11/005; B25J 13/086; B25J 15/0052; B25J 15/0666; B62D 65/024; B62D 65/14; B66C 1/0225; B66C 1/0237; B66C 1/0243
USPC .......................................................... 294/65
See application file for complete search history.

(56) References Cited

U.S. PATENT DOCUMENTS

| | | | | |
|---|---|---|---|---|
| 3,734,325 A | * | 5/1973 | Stone | B66C 1/0256 414/626 |
| 4,662,668 A | * | 5/1987 | Hufford | B25J 13/086 414/737 |
| 5,707,094 A | * | 1/1998 | Gower | B66D 3/18 294/188 |
| 7,409,812 B2 | * | 8/2008 | Gilmore | B65G 57/04 53/473 |
| 7,953,509 B2 | * | 5/2011 | Murayama | B25J 13/085 108/1 |
| 8,677,626 B2 | * | 3/2014 | Adas | B25B 11/007 29/559 |
| 8,832,918 B2 | * | 9/2014 | Ali | B62D 65/06 29/709 |
| 10,926,403 B1 | * | 2/2021 | Asokan | B25J 15/0052 |
| 2022/0088799 A1 | * | 3/2022 | Gao | B25J 15/0028 |

FOREIGN PATENT DOCUMENTS

DE 102014221385 A1 4/2016

OTHER PUBLICATIONS

German Office Action from counterpart DE1020241026553, dated Sep. 4, 2024.

* cited by examiner

*Primary Examiner* — Dean J Kramer

(57) ABSTRACT

A tool configured for installing trim molding at an installation site. The tool includes: first coupling members configured to couple the trim molding to the tool; second coupling members configured to couple the tool to the installation site; and an actuator configured to move the trim molding off of the first coupling members and onto the installation site when the tool is coupled to the installation site with the second coupling members.

13 Claims, 7 Drawing Sheets

SYSTEMS AND METHODS FOR INSTALLING TRIM MOLDING

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for installing trim molding, such as interior and exterior trim molding for a vehicle.

Trim molding is typically installed manually. For example, an operator will manually position the trim molding at an installation site. The operator will then manually apply an insertion force to the trim molding to move coupling members of the trim molding into cooperation with coupling members at the installation site to secure the trim molding in place.

SUMMARY

The present disclosure includes, in various features, a tool configured for installing trim molding at an installation site. The tool includes: first coupling members configured to couple the trim molding to the tool; second coupling members configured to couple the tool to the installation site; and an actuator configured to move the trim molding off of the first coupling members and onto the installation site when the tool is coupled to the installation site with the second coupling members.

In further features, the tool includes a bracket, the first coupling members, the second coupling members, and the actuator are mounted to the bracket.

In further features, a balancer is configured to cooperate with the bracket to mount the bracket to an overhead rail and facilitate manual positioning of the bracket.

In further features, the trim molding is a vehicle molding and the installation site is on a vehicle.

In further features, the first coupling members include vacuum cups.

In further features, the second coupling members include vacuum pads.

In further features, the actuator includes a short stroke cylinder.

In further features, a proximity sensor is configured to measure proximity of the tool to the installation site.

In further features, a control panel is configured to accept manual inputs for operating the first coupling members and the actuator.

In further features, a controller is configured to: activate the first coupling members to couple the trim molding to the tool in response to a first input entered by a user at a control panel; determine a distance of the tool to the installation site based on proximity inputs received by the controller from a proximity sensor included with the tool; and activate the second coupling members to connect the tool to the installation site when the tool is within a predetermined distance of the installation site.

In further features, the controller is configured to activate the actuator in response to a second input entered by the user at the control panel, and deactivate the second coupling members to detach the tool from the installation site.

In further features, the tool is configured to be mounted to a robotic end effector.

In further features, a controller is configured to: move the robotic end effector to position the first coupling members against the trim molding, and activate the first coupling members to couple the tool to the trim molding; move the robotic end effector to align the trim molding with the installation site based on alignment inputs received by the controller from an alignment sensor of the tool; determine a distance of the tool to the installation site based on proximity inputs received by the controller from a proximity sensor of the tool; activate the second coupling members to connect the tool to the installation site when based on the alignment inputs the trim molding is aligned with the installation site, and based on the proximity inputs from the controller the tool is within a predetermined distance of the installation site; activate the actuator to push the trim molding into cooperation with the installation site; and deactivate the second coupling members to detach the tool from the installation site.

In further features, the controller is configured to: receive an actuation input from the actuator identifying an actuation distance traveled by a rod of the actuator; determine based on the actuation distance whether the trim molding was successfully installed at the installation site; and re-activate the actuator after determining that the trim molding was not successfully installed at the installation site.

The present disclosure further includes a tool configured for installing trim molding at an installation site. The tool includes: first coupling members configured to couple the trim molding to the tool; second coupling members configured to couple the tool to the installation site; a proximity sensor configured to measure a distance between the tool and the installation site; an actuator configured to move the trim molding off of the first coupling members and onto the installation site when the tool is coupled to the installation site with the second coupling members; and a controller configured to activate the second coupling members to connect the tool to the installation site when based on inputs from the proximity sensor the controller determines that the distance of the tool to the installation site is within a predetermined distance.

In further features, the controller is further configured to activate the actuator to push the trim molding into cooperation with the installation site after the tool is coupled to the installation site by the second coupling members.

In further features, the controller is further configured to: receive an actuation input from the actuator identifying an actuation distance traveled by a rod of the actuator; determine based on the actuation distance whether the trim molding was successfully installed at the installation site; and re-activate the actuator after determining that the trim molding was not successfully installed at the installation site.

The present disclosure also includes, in various features, a method for installing trim molding at an installation site. The method includes: moving a tool into cooperation with the trim molding to connect the trim molding to the tool; aligning the trim molding at the installation site with the tool; coupling the tool to the installation site after aligning the trim molding; installing the trim molding at the installation site by activating an actuator of the tool to push the trim molding off of the tool into cooperation with the installation site; and decoupling the tool from the installation site.

In further features, the method includes reattempting to install the trim molding at the installation site in response to determining that the actuator did not completely extend.

In further features, the method includes moving the tool with a robotic arm.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure includes systems and methods for at least partially automating installation of a part. The systems and methods are suitable for installing any suitable part at any suitable installation site. For example, the part may be or include a trim molding and the installation site may be on a vehicle, such as at an exterior or interior of the vehicle. The trim molding may be any suitable trim molding, such as any suitable Class A surface. For example, the trim molding may include fender trim molding, door trim molding, front trim molding, rear trim molding, lip trim molding, a vehicle spoiler, headlamp trim molding, interior instrument panel trim molding, etc. The systems and methods of the present disclosure are also suitable for installing non-vehicular trim molding at any suitable non-vehicular installation site.

Figure 1:
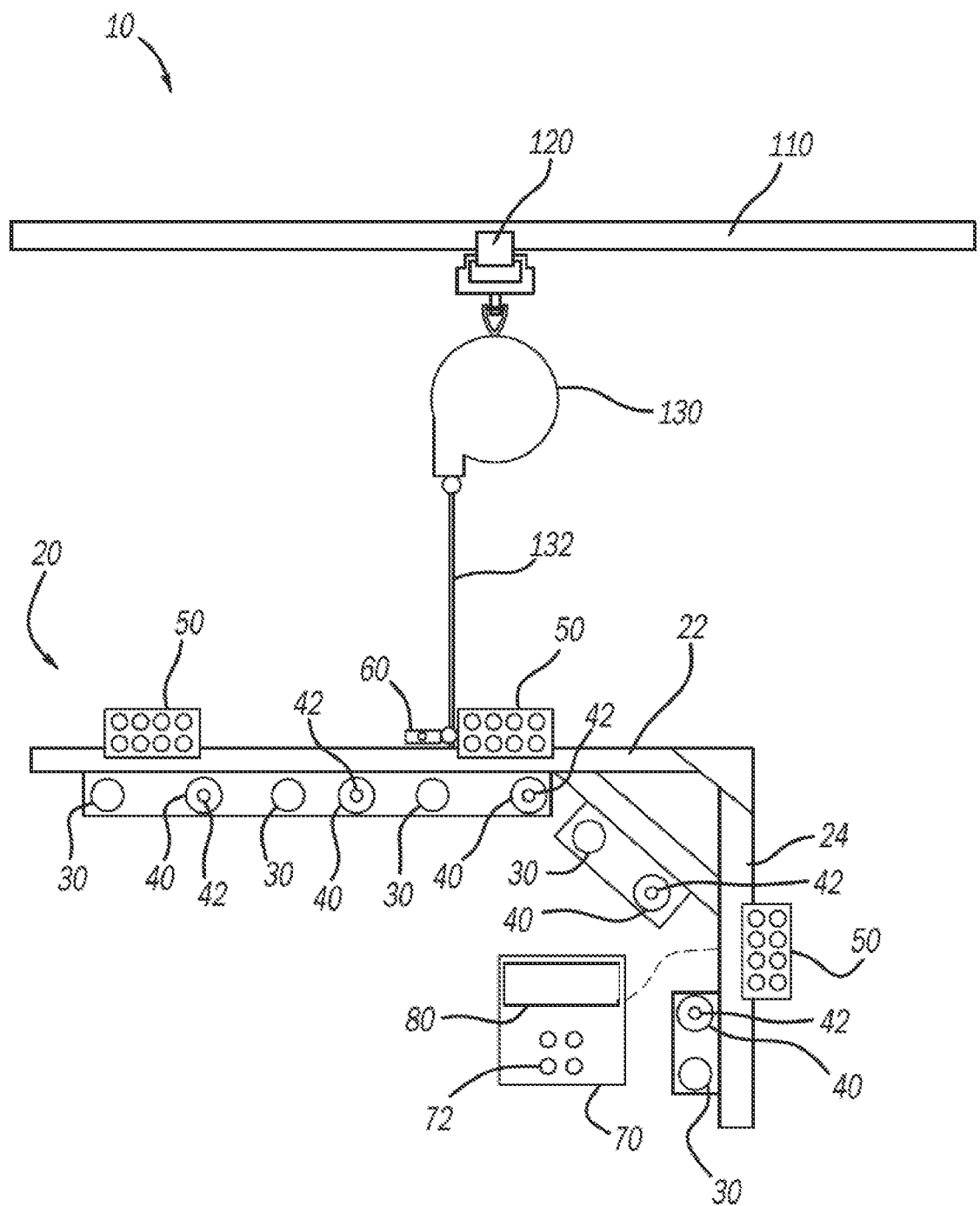
FIG. 1 illustrates an installation system for trim molding in accordance with the present disclosure.
Figure 2:
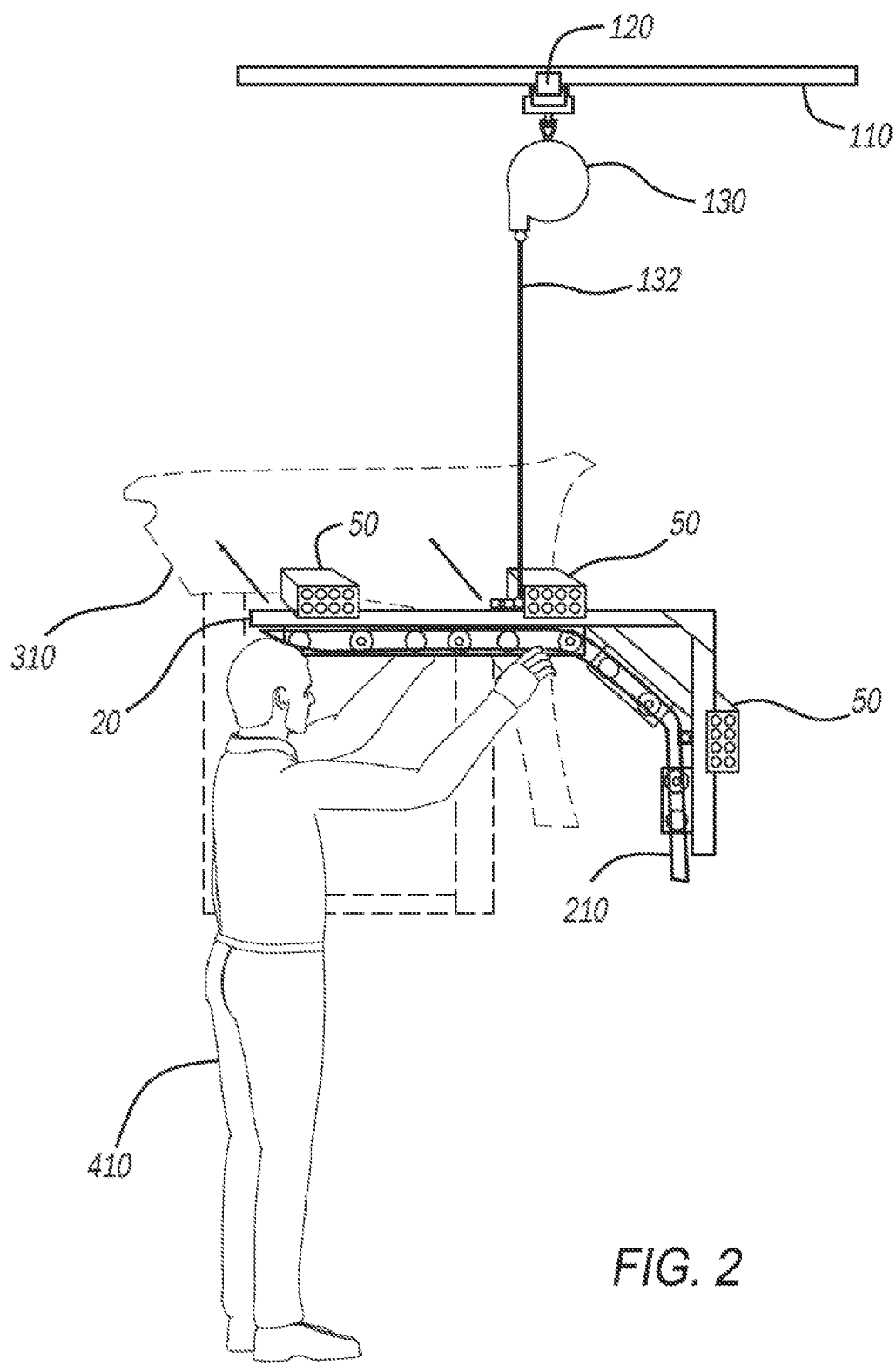
FIG. 2 illustrates use of the installation system of FIG. 1 for installing a fender trim molding at an installation site on a vehicle fender.

FIG. 1 illustrates an installation system 10 in accordance with the present disclosure for installing a part at an installation site. The installation system 10 includes a tool 20. The tool 20 includes a bracket 22. The bracket 22 may be of any suitable size and shape, and may depend upon the size and shape of the part to be installed. In the example of FIG. 1, the tool 20 includes the bracket 22 as a first bracket, and a second bracket 24 extending at a right angle from the bracket 22. The tool 20 may have any suitable number of brackets arranged at any suitable orientation to facilitate installation of the part. With reference to FIG. 2, for example, the part is a trim molding 210 configured for installation on a vehicle fender 310. To facilitate installation of the trim molding 210, the tool 20 includes the brackets 22, 24 arranged at a right angle, which facilitates cooperation between the tool 20 and the trim molding 210.

The tool 20 further includes a plurality of first coupling members configured to couple the trim molding 210 to the tool 20. Any suitable coupling members may be included, such as vacuum cups 30 configured as trim molding coupling members. Any suitable number of vacuum cups 30 may be included, and the vacuum cups 30 may be positioned at any suitable locations on the tool 20. In the example illustrated, the vacuum cups 30 are spaced apart along the brackets 22 and 24, as well as between the brackets 22, 24.

Figure 3:
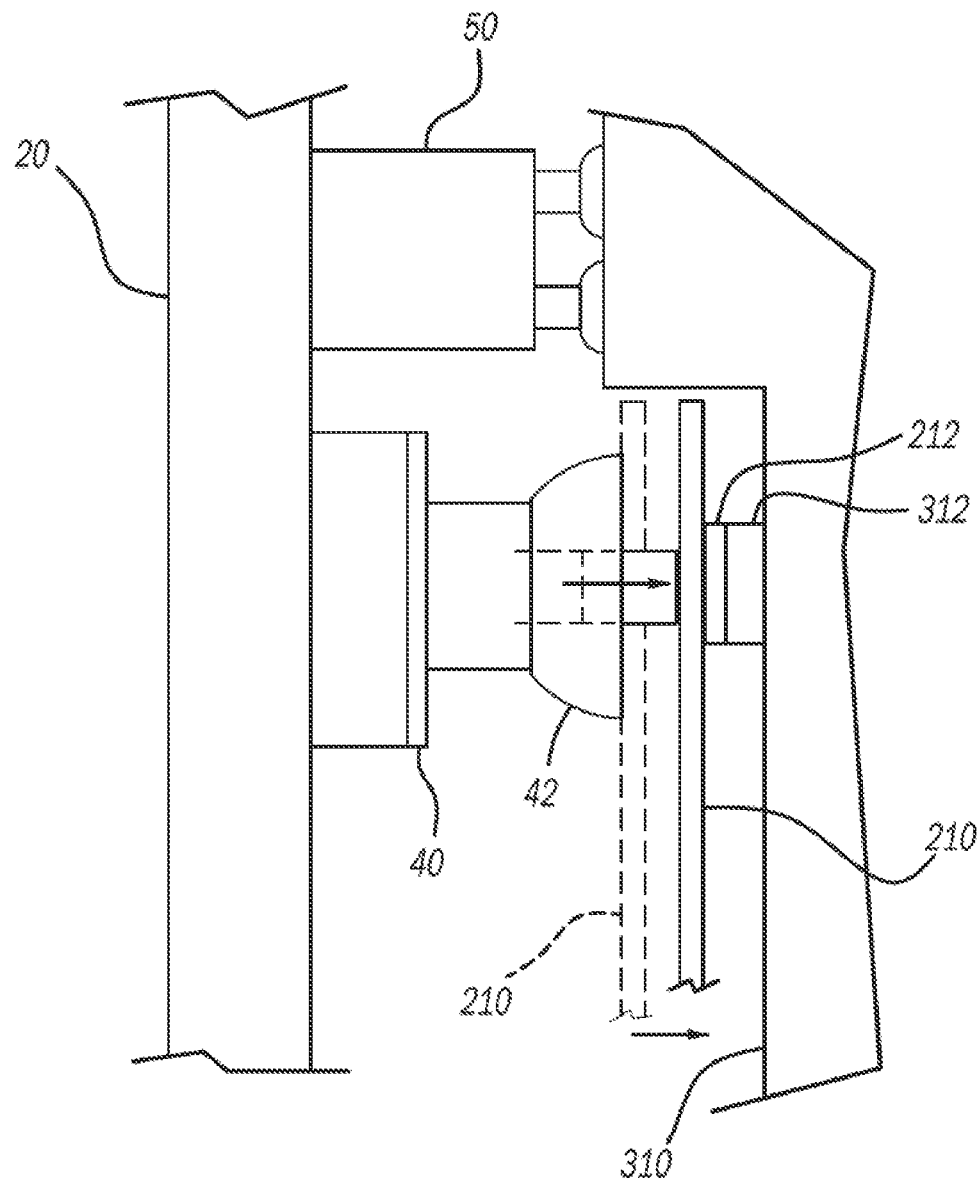
FIG. 3 illustrates operation of the installation system of FIG. 1 to move the fender trim molding onto the installation site.

The tool 20 further includes a plurality of second coupling members configured to couple the tool 20 to any suitable installation site. FIGS. 2 and 3 illustrate the exemplary installation site 310 in the form of a vehicle fender. Any suitable coupling members may be included, such as vacuum pads 50 configured as tool coupling members. Any suitable number of vacuum pads 50 may be included, and the vacuum pads 50 may be positioned at any suitable locations on the tool 20. In the example illustrated, the vacuum pads 50 are mounted to the brackets 22 and 24.

The tool 20 also includes one or more actuators 40. The actuators 40 are configured to push, or otherwise move, the trim molding 210 off the vacuum cups 30 and onto the installation site 310 when the tool 20 is coupled to the installation site 310. The actuators 40 may be configured in any suitable manner to push the trim molding 210 off of the tool 20. For example, the actuators 40 may be configured as short stroke cylinders with push rods 42. The actuators 40 are spaced apart about the brackets 22, 24, and may be arranged between the brackets 22, 24 to provide a generally even actuation force across the trim molding 210 to push the trim molding 210 onto the installation site 310.

The system 10 further includes a control panel 70, which may be mounted to the tool 20 or connected to the tool 20. The control panel 70 includes any suitable user interface, such as buttons 72, configured for use by an operator 410 to operate the installation system 10. The control panel 70 further includes a controller 80. In response to inputs from the operator 410 by way of the buttons 72, the controller 80 is configured to activate and deactivate the vacuum cups 30, the actuators 40, and the vacuum pads 50, as explained further herein. The controller 80 may be included with the control panel 70, or otherwise mounted to the tool 20. The controller 80 may also be spaced apart from the tool 20, and connected to the vacuum cups 30, the vacuum pads 50, the actuators 40, and sensors of the tool 20, which are described herein, in any suitable manner.

The tool 20 further includes a proximity sensor 60, which is configured to identify a distance between the tool 20 and the installation site 310. The proximity sensor 60 is in cooperation with the controller 80. Based on inputs from the proximity sensor 60, the controller 80 is configured to identify a distance between the tool 20 and the installation site 310. When based on inputs from the proximity sensor 60 the controller 80 determines that the tool 20 is within a predetermined distance of the installation site 310, the controller 80 is configured to activate the vacuum pads 50 to secure the tool 20 to the installation site 310.

As illustrated in FIGS. 1 and 2, the tool 20 may be hung from a balancer 130, with a cable 132 of the balancer 130 connected to the bracket 22 of the tool 20. The balancer 130 may be hung from any suitable rail 110 with a connector 120. Mounting the tool 20 to the rail 110 facilitates movement of the tool 20 by the operator 410 to and from the installation site 310, as well as to and from a pick area including one or more of the trim moldings 210. For example, weight of the trim molding 210 and the tool 20 is supported by the balancer 130 and the rail 110, thereby reducing workload of the operator 410.

FIG. 3 illustrates the tool 20 connected to the installation site 310 by way of the vacuum pads 50. After the tool 20 is mounted to the installation site 310, the operator 410 no longer needs to hold the tool 20. To install the trim molding 210, the operator 410 inputs an installation command to the controller 80 by way of the control panel 70. In response, the controller 80 is configured to activate the actuators 40 to extend the piston rods 42, which as illustrated in FIG. 3 push the trim molding 210 onto the installation site 310 to bring first connectors 212 of the trim molding 210 into cooperation with second connectors 312 of the installation site 310. This cooperation between the first connectors 212 and the second connectors 312 mounts the trim molding 210 at the installation site 310.

Figure 4:
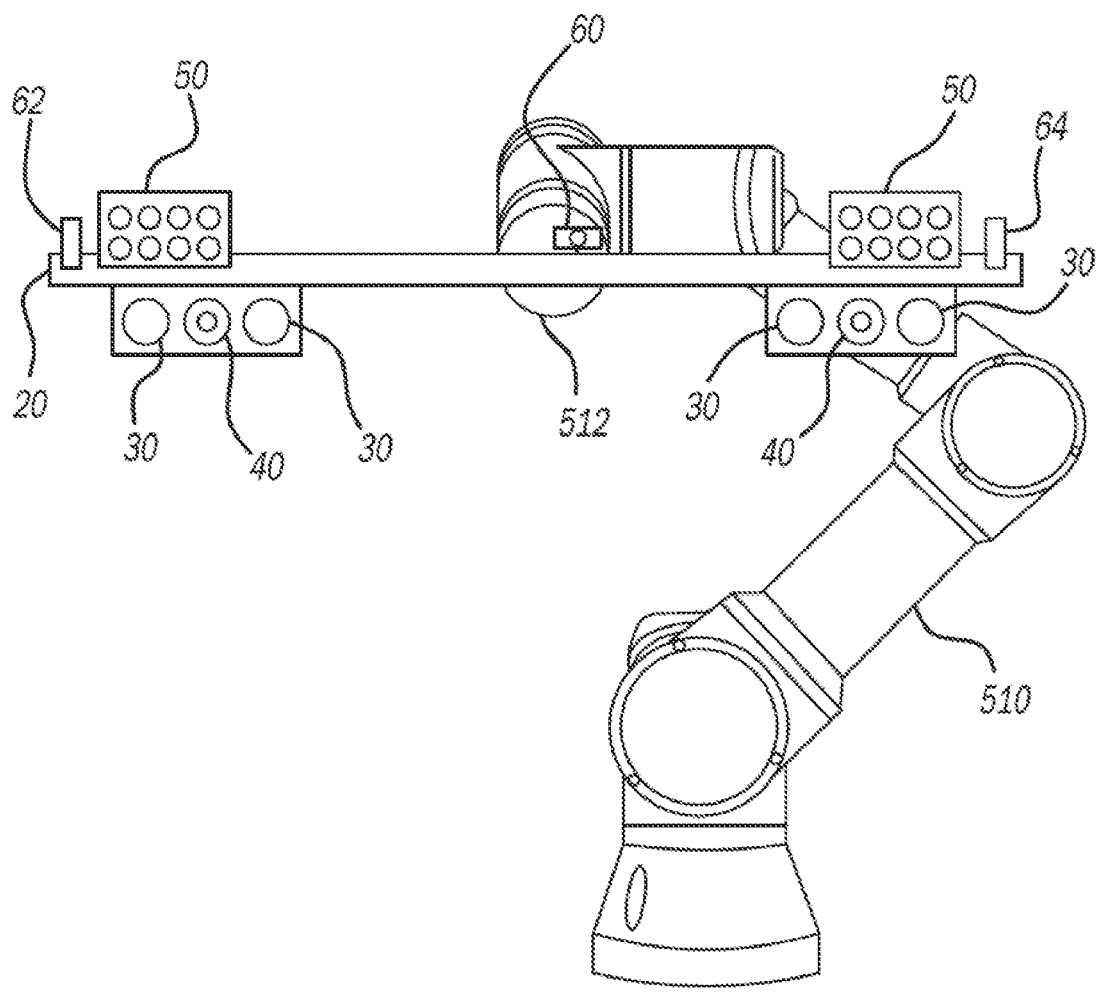
FIG. 4 illustrates a tool of the installation system mounted to an end effector of a robotic arm.

With reference to FIG. 4, the tool 20 may be mounted to a robotic arm 510, such as on an end effector 512 of the robotic arm 510. The robotic arm 510 is configured to maneuver the tool 20 to pick up the trim molding 210 from a pick site, maneuver the trim molding 210 to the installation site 310, and install the trim molding 210 as explained herein. In the configuration of FIG. 4, the tool 20 further includes a first alignment sensor 62 and a second alignment sensor 64, each of which are configured for aligning the trim molding 210 at the installation site 310. Operation of the robotic arm 510 to install the trim molding 210 is described further herein in the discussion of the method 710 at FIGS. 6A and 6B.

Figure 5:
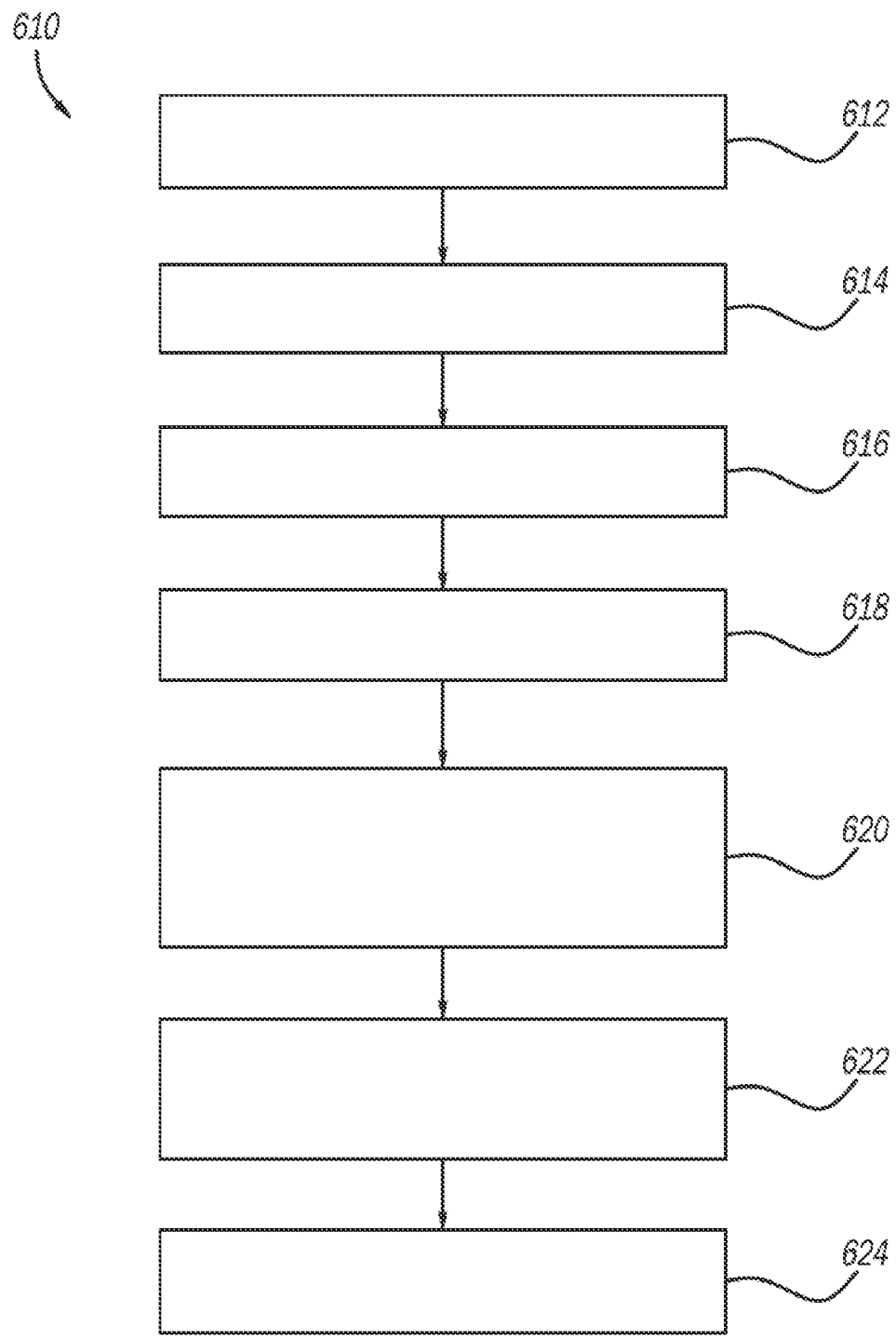
FIG. 5 illustrates a method in accordance with the present disclosure for installing a trim molding at an installation site.

FIG. 5 illustrates an exemplary method 610 in accordance with the present disclosure for mounting the trim molding 210 to the installation site 310 with a semi-automated process. At block 612, the controller 80 activates the vacuum cups 30 (first coupling members) configured as trim molding coupling members in response to an input entered by the operator 410 by way of the control panel 70 to couple the trim molding 210 to the tool 20. The tool 20 is initially moved to the trim molding 210 by the operator 410, by the robotic arm 510, or in any other suitable manner. At block 614, the trim molding coupling members configured as the vacuum cups 30 couple the trim molding to the tool.

At block 616, the tool 20 with the trim molding 210 coupled thereto is maneuvered to the installation site 310, such as by the operator 410, the robotic arm 510, or in any other suitable manner. At block 618, proximity of the tool 20 relative to the installation site 310 is determined by the proximity sensor 60. The proximity sensor 60 transmits an input to the controller 80 indicating the distance between the tool 20 and the installation site 310. When based on inputs from the proximity sensor 60 the controller 80 determines that the tool 20 is within a predetermined distance of the installation site 310, at block 620 the controller 80 is configured to activate the vacuum pads 50 (second coupling members) configured as tool coupling members to connect the tool 20 to the installation site 310.

After the tool 20 is mounted to the installation site by way of the vacuum pads 50, at block 622 the controller 80 is configured to activate the actuators 40 causing the piston rods 42 to extend outwards, as illustrated in FIG. 3. The rods 42 push the trim molding 210 off of the tool 20 and onto the installation site 310. First connectors 212 of the trim molding 210 cooperate with second connectors 312 at the installation site 310 to mount the trim molding 210 to the installation site 310. After the trim molding 210 is mounted, at block 624 the controller 80 is configured to deactivate the vacuum pads 50 to detach the tool 20 from the installation site 310. The tool 20 is then ready to install another trim molding at another installation site.

Figure 6A:
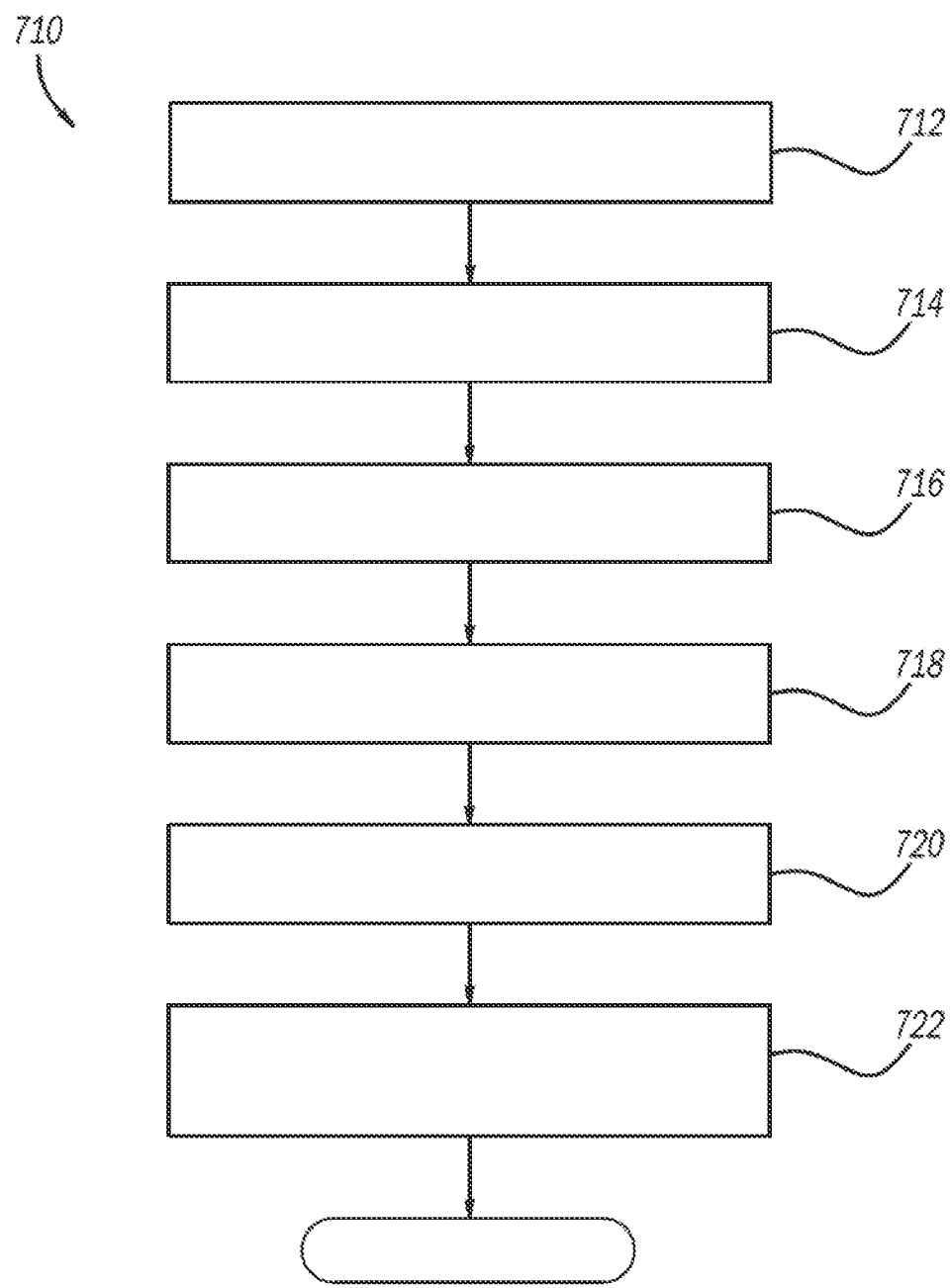
FIG. 6A illustrates another method in accordance with the present disclosure for installing a trim molding at an installation site.
Figure 6B:
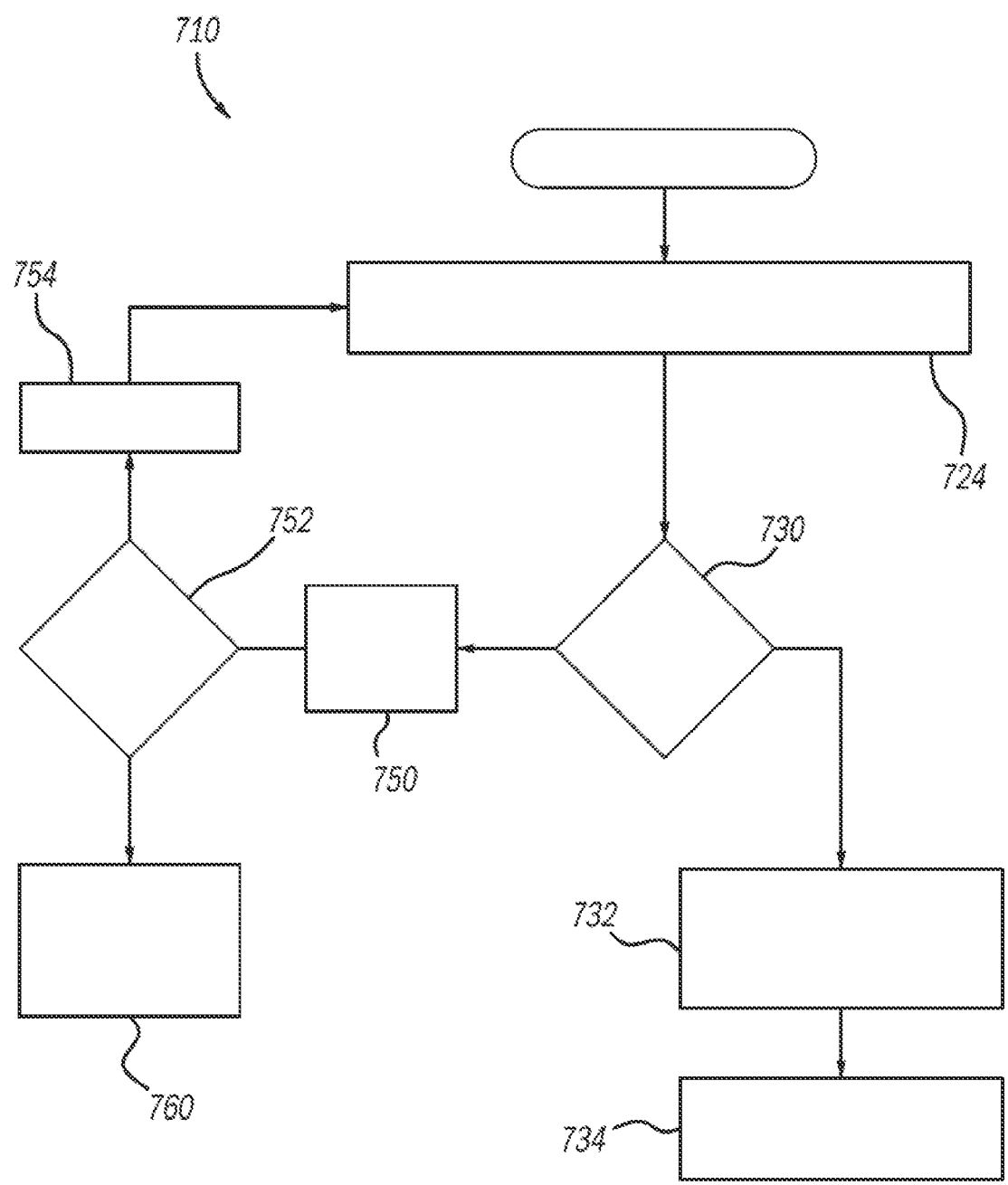
FIG. 6B is a continuation of the method of FIG. 6A.

FIGS. 6A and 6B illustrate another method 710 in accordance with the present disclosure, which includes use of the robot arm 510 and the tool 20 as configured in FIG. 4. Upon receipt of a start command, the controller 80 is configured to activate the vacuum cups 30 of the tool 20 at block 712. At block 714, the controller 80 moves the tool 20 by actuating the robot arm 510 to a pick position where the trim molding 210 is stored. At block 716, the controller 80 operates the robot arm 510 to move the vacuum cups 30 into cooperation with the trim molding 210 to connect the tool 20 to the trim molding 210. At block 718, the controller 80 moves the robot arm 510 to position the trim molding 210 at the installation site 310. At block 718 the controller 80 aligns the trim molding 210 with the installation site 310 based on inputs received from the alignment sensors 62, 64.

At block 720, the controller 80 detects proximity of the tool 20 to the installation site 310 based on inputs from the proximity sensor 60. When based on inputs from the proximity sensor 60 the controller 80 determines that the tool 20 is within a predetermined distance from the installation site 310, at block 722 the controller 80 activates the vacuum pads 50 to connect the tool 20 to the installation site. At block 724, the controller 80 activates the actuators 40 to extend the piston rods 42 thereof. As the piston rods 42 extend, the piston rods 42 push the trim molding 210 off of the tool 20 and onto the installation site 310. As illustrated in FIG. 3, the first connectors 212 of the trim molding 210 cooperate with the second connectors 312 of the installation site 310 to mount the trim molding 210 to the installation site 310.

From block 724, the method 710 proceeds to block 730. At block 730, the controller 80 determines whether or not the installation of the trim molding 210 was successful. This determination can be made in any suitable manner. For example, based on inputs from the actuators 40, the controller 80 is configured to identify any of the piston rods 42 that did not fully extend. If all of the piston rods 42 did fully extend, the controller 80 is configured to deem the installation as successful. In view of a successful installation, the controller 80 proceeds to block 732. At block 732, the controller 80 is configured to deactivate the vacuum pad 50 to detach the tool 20 from the installation site 310. At block 734, the controller 80 is configured to move the robot arm 510 and the end effector 512 away from the installation site 310 back to the pick location to retrieve another trim molding for installation, or otherwise return to a predetermined home position.

If based on inputs from the actuators 40 the controller 80 determines that one or more of the piston rods 42 did not fully extend, at block 730 the controller 80 deems the installation to be unsuccessful. In the event of an unsuccessful installation, the controller proceeds from block 730 to block 750. At block 750, the controller 80 logs the unsuccessful installation attempt, and then proceeds to block 752. At block 752, the controller 80 determines whether the number of installation attempts has exceeded a predetermined limit. If the predetermined limit has not been exceeded, the method 710 proceeds to block 754. At block 754, the controller 80 is configured to attempt the installation by again. From block 754, the method 710 returns to block 724 and then block 730. At block 730, the controller 80 again determines whether the installation was successful based on whether or nor all of the piston rods 42 sufficiently extended. If at block 752 the predetermined number of installation attempts is exceeded, the method 710 proceeds to block 760. At block 760, the controller 80 generates an alert and pauses operation of the installation. The alert is generated to the operator 410, for example, to allow the operator 410 to troubleshoot the installation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A tool configured for installing trim molding at an installation site, comprising:
    first coupling members configured to couple the trim molding to the tool;
    second coupling members configured to couple the tool to the installation site;
    an actuator configured to move the trim molding off of the first coupling members and onto the installation site when the tool is coupled to the installation site with the second coupling members; and
    a controller configured to:
        activate the first coupling members to couple the trim molding to the tool in response to a first input;
        determine a distance of the tool to the installation site based on proximity inputs received by the controller from a proximity sensor included with the tool; and
        activate the second coupling members to connect the tool to the installation site when the tool is within a predetermined distance of the installation site.

2. The tool of claim 1, further comprising a bracket; wherein the first coupling members, the second coupling members, and the actuator are mounted to the bracket.

3. The tool of claim 2, further comprising a balancer configured to cooperate with the bracket to mount the bracket to an overhead rail and facilitate manual positioning of the bracket.

4. The tool of claim 1, wherein the trim molding is a vehicle molding and the installation site is on a vehicle.

5. The tool of claim 1, wherein the first coupling members include vacuum cups.

6. The tool of claim 1, wherein the second coupling members include vacuum pads.

7. The tool of claim 1, wherein the actuator includes a short stroke cylinder.

8. The tool of claim 1, further comprising a proximity sensor configured to measure proximity of the tool to the installation site.

9. The tool of claim 1, further comprising a control panel configured to accept manual inputs for operating the first coupling members and the actuator.

10. The tool of claim 1, wherein the controller is further configured to activate the actuator in response to a second input, and deactivate the second coupling members to detach the tool from the installation site.

11. A tool configured for installing trim molding at an installation site, comprising:
    first coupling members configured to couple the trim molding to the tool;
    second coupling members configured to couple the tool to the installation site;
    a proximity sensor configured to measure a distance between the tool and the installation site;
    an actuator configured to move the trim molding off of the first coupling members and onto the installation site when the tool is coupled to the installation site with the second coupling members; and
    a controller configured to activate the second coupling members to connect the tool to the installation site when based on inputs from the proximity sensor the controller determines that the distance of the tool to the installation site is within a predetermined distance,
    wherein the controller is further configured to:
        activate the actuator to push the trim molding into cooperation with the installation site after the tool is coupled to the installation site by the second coupling members,
        receive an actuation input from the actuator identifying an actuation distance traveled by a rod of the actuator,
        determine based on the actuation distance whether the trim molding was successfully installed at the installation site, and
        re-activate the actuator after determining that the trim molding was not successfully installed at the installation site.

12. A tool configured to be mounted to a robotic end effector for installing trim molding at an installation site, the tool comprising:
    first coupling members configured to couple the trim molding to the tool;
    second coupling members configured to couple the tool to the installation site;
    an actuator configured to move the trim molding off of the first coupling members and onto the installation site when the tool is coupled to the installation site with the second coupling members;
    a controller configured to:
        move the robotic end effector to position the first coupling members against the trim molding, and activate the first coupling members to couple the tool to the trim molding;
        move the robotic end effector to align the trim molding with the installation site based on alignment inputs received by the controller from an alignment sensor of the tool;
        determine a distance of the tool to the installation site based on proximity inputs received by the controller from a proximity sensor of the tool;
        activate the second coupling members to connect the tool to the installation site when based on the alignment inputs the trim molding is aligned with the installation site, and based on the proximity inputs from the controller the tool is within a predetermined distance of the installation site;
        activate the actuator to push the trim molding into cooperation with the installation site; and
        deactivate the second coupling members to detach the tool from the installation site.

13. The tool of claim 12, wherein the controller is further configured to:
    receive an actuation input from the actuator identifying an actuation distance traveled by a rod of the actuator; and
    determine based on the actuation distance whether the trim molding was successfully installed at the installation site; and
    re-activate the actuator after determining that the trim molding was not successfully installed at the installation site.

* * * * *